United States Patent [19]

Elmer et al.

[11] 4,169,112

[45] Sep. 25, 1979

[54] HEAT AND HUMIDITY RESISTANT STEEL REINFORCED TIRE

[75] Inventors: Otto C. Elmer, Akron; Donald G. Conley, Hudson; Robert J. Payne, Cuyahoga Falls, all of Ohio

[73] Assignee: The General Tire & Rubber Company, Akron, Ohio

[21] Appl. No.: 955,816

[22] Filed: Oct. 30, 1978

[51] Int. Cl.$^2$ .............................................. C08L 7/00
[52] U.S. Cl. ................... 260/762; 260/42.22; 260/42.31; 260/42.32; 260/42.33; 260/42.34; 260/42.35; 260/42.36; 260/45.8 NT; 260/779 R; 260/799; 260/801; 260/805

[58] Field of Search ............... 260/42.22, 42.32, 42.36, 260/42.33, 42.34, 42.35, 756, 762, 779 R, 799, 801, 805, 806, 45.8 NT, 42.31; 152/168, 354 RB, 355, 386

[56] References Cited

U.S. PATENT DOCUMENTS

| 3,983,919 | 10/1976 | Messerly | 260/42.32 |
| 4,092,455 | 5/1978 | Pinto et al. | 260/762 |

Primary Examiner—Lewis T. Jacobs

[57] ABSTRACT

This invention relates to an improvement of the adhesion of brass-coated steel tire cord to a vulcanized rubber composition. The adhesion is obtained by adding an aromatic triazole and an organo cobalt compound to an unvulcanized rubber compound in order to obtain metal-rubber bonding when vulcanized. Tires formed by the above process have good resistance to heat and moisture.

5 Claims, 1 Drawing Figure

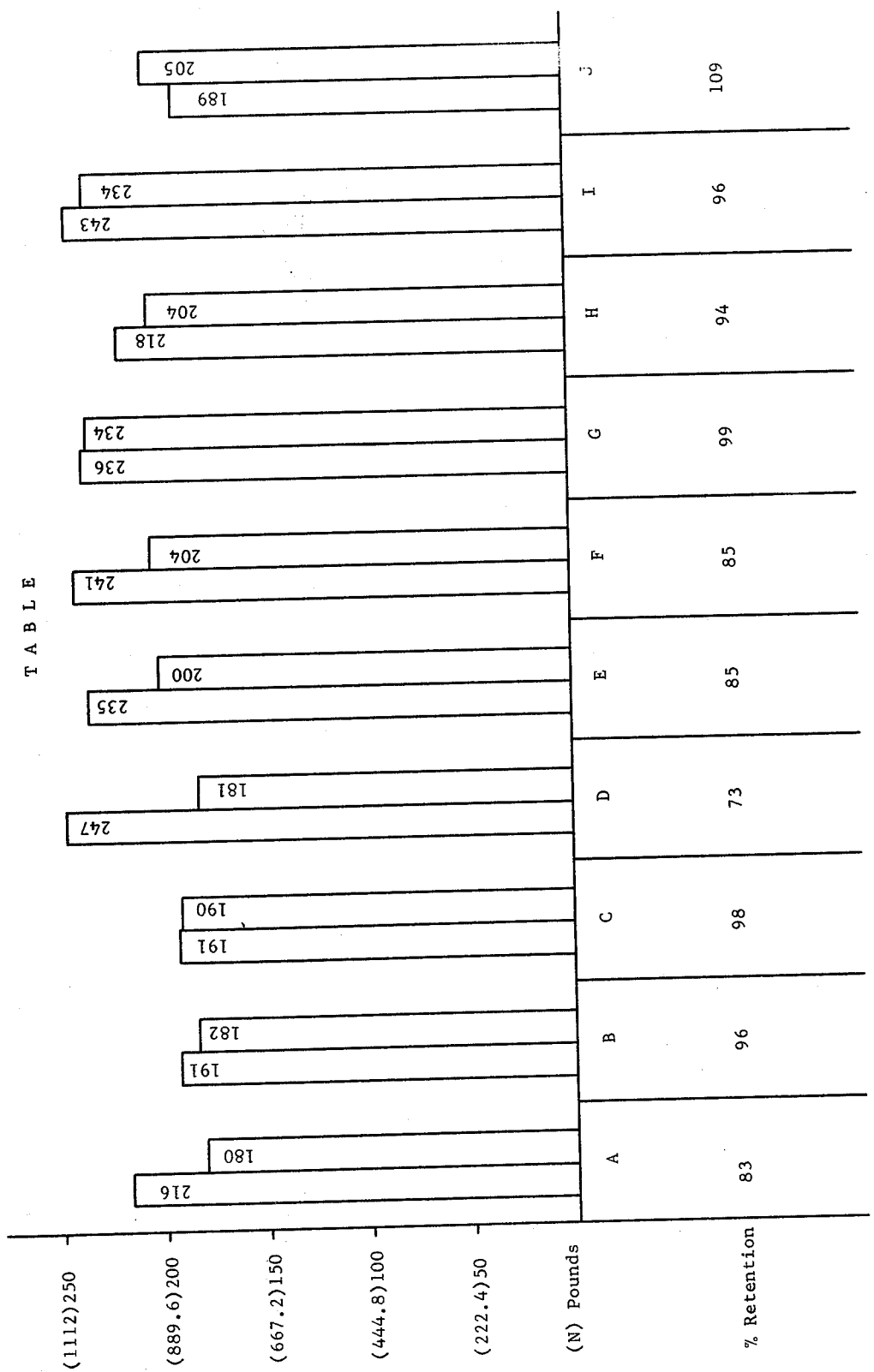

HEAT AND HUMIDITY RESISTANT STEEL REINFORCED TIRE

This invention relates to vulcanizingly bonded brass-plated tire cord to a rubber composition combined with an aromatic triazole and optionally an organic cobalt compound.

The quality of steel cord reinforced tires are affected by adhesion between steel and rubber, particularly when exposed to heat and moisture. One problem is that the brass-plating on the cords release copper ions which catalyze the degradation of the rubber. Another problem is that the steel cords corrode due to moisture and rubber does not adhere well at the corroded interface. The amount of corrosion on the steel cords affects the ability of the tire to be retreaded and can also cause delamination of the tire in use.

Various expedients have been attempted to avoid the rust problem. These include:
(1) spacing the steel cords so far apart that rust cannot spread from one cord to the next;
(2) decreasing the cohesive strength of the rubber surrounding the cords so that it will break internally before it pulls loose from the cord; and,
(3) coating the brass-plated steel cord with,
    (a) a mineral oil solution of benzotriazole, CA 80 60836 (1974),
    (b) triazole vapor, Belgium Pat. No. 849,929, and,
    (c) molten triazole, Belgium Pat. No. 849,928.

It is also known that coating a copper alloy with a styrene butadiene copolymer containing 1,2,3, benzotriazole will improve adhesion, CA 66 86767c (1967).

While the aromatic triazole treated brass-plated steel cords exhibited excellent corrosion resistance when immersed in water, the results did not extrapolate to their performance in rubber. Bond adhesions between the steel cord and rubber dropped significantly upon humid aging.

The present invention is based upon the discovery that if from 0.1 to 3.0 phr of an aromatic triazole is incorporated into the rubber surrounding the steel cord that the steel cord corrosion is greatly reduced and the bond strength between the steel cord and the rubber remains near the initial values upon humid aging. It has been further discovered that the initial adhesion and the humid aged adhesion is further improved if from 0.1 to 5.0 phr of an organo cobalt compound is present with the aromatic triazole. The term phr refers to parts by mass per hundred parts by mass of rubber.

The drawing is a bar graph showing the initial and aged adhesion obtained using various levels of various triazoles and cobalt adhesion promotor.

The preferred triazoles are benzotriazole and tolyltriazole, both commercially available. It is also contemplated that the 2',3':4.5 naphthotriazoles and the 1',2':4.5 naphthotriazole are also operative, see Beilstein 26, 72, I 17, II 38 for structure and preparation. The C-methyl and C-ethyl derivatives, it is contemplated, could be prepared from the corresponding diamines and sodium nitrite in acid medium.

The preferred cobalt adhesion promotor is Manobond C-16 which contains a compound of the formula $(R-CO_2-Co-O)_3B$ where R is a branched hydrocarbon chain having an average of 21 carbon atoms, 5 of which were in methyl radicals. Manobond C contains 16% by mass of cobalt. Other cobalt containing adhesion promotors can also be used, such as the cobalt soaps including the fatty acids and naphthenates having from 6 to 24 carbon atoms. Examples include cobalt naphthenate and cobalt stearate.

The cobalt soaps, however, do not give results which are as consistent as those obtained using Manobond C.

Basically what is being claimed as one facet of the invention, is a sufficient amount of an organo cobalt adhesion promotor in combination with a sufficient amount of an aromatic triazole to significantly improve the adhesion of the rubber skim stock to the brass-plated steel cord.

Another ingredient in the rubber surrounding the steel cord is an antioxidant. Antioxidants are normally present in the skim stock surrounding the brass-plated steel cords. The preferred antioxidants are of the amine type and include Santoflex 13 antioxidant which is N-(1,3 dimethylbutyl) N'-phenyl p-phenylene-diamine and Flexamine G, an antioxidant which is 65% complex diarylamine-ketone reaction product and 35% N,N'-diphenyl p-phenylene-diamine.

The following skim stock was formulated. Various levels, as set forth in the TABLE, of a triazole and a cobalt adhesion promotor were added and adhesions to a brass-plated steel cord were measured. The cobalt adhesion promotor was Manobond C-16, described earlier. The adhesion test involved embedding cords in a rubber sample and measuring the force required to pull them out. A sample ⅝ inch (1.6 cm)×½ inch (1.2 cm) and 9½ inches (24.1 cm) long had cords embedded ⅝ inch (1.6 cm) placed at ½ inch (1.2 cm) intervals. The composite was cured for 30 minutes at 307° F. (152° C.). Eight cords were pulled. The remaining sample was then aged 12 hours at 200° F. (94° C.) at greater than 95% humidity, and eight more cords were pulled. The cords were 0.065 (1.6 mm) inch thick and composed of 7 bundles of 4 filaments having 0.0079 inch (0.020 mm) diameter.

The left bar of each pair represents the unaged adhesion and the right bar of each pair represents the humid aged adhesion.

TABLE

| Letter at Base of Bar Graph | Composition Represented |
| --- | --- |
| A | Standard compound |
| B | .5 parts tolyltriazole |
| C | .5 parts benzotriazole |
| D | 1.0 parts cobalt adhesion promotor |
| E | .5 parts tolyltriazole 1.0 parts cobalt adhesion promotor |
| F | .5 parts benzotriazole 1.0 parts cobalt adhesion promotor |
| G | .75 parts tolyltriazole 1.0 parts cobalt adhesion promotor |
| H | .75 parts benzotriazole 1.0 parts cobalt adhesion promotor |
| I | .25 parts tolyltriazole 1.0 parts cobalt adhesion promotor |
| J | .25 parts benzotriazole |

| Standard carcass skim compound | |
| --- | --- |
| Natural rubber | 100.0 |
| N-330 (HAF) high abrasion furnace black, small particle size | 30.0 |
| Zinc oxide | 10.0 |
| Stearic acid | 1.5 |
| Santoflex 13 | 2.0 |

TABLE-continued

| | |
|---|---|
| HiSil (hydrated precipitated silica dioxide) | 15.0 |
| Sulfur | 3.00 |
| Vulkacit DZ N-dicyclohexyl benzothiazyl sulfenamide | 1.30 |
| Cohedur RL which is composed of equal parts of resorcinol and hexamethylol melamine pentamethyl ether with a small amount of dibutyl phthalate for viscosity control | 4.60 |

Attempts to apply the triazole directly to the brass-plated cord prior to coating with skim stock did not effectively inhibit corrosion on high humidity heat aging.

Truck tires were built using 0.75 parts of tolyltriazole and 1.1 parts Manobond C-16 in the above standard carcass skim compound. The skim stock was applied to the brass cords. In addition, strips of the skim stock were folded over the edges of the cut ends of the brass-plated steel cords. To the tires were added one quart (900 cc) of water. The tires were run for 30,000 miles. One tire failed for reasons other than steel to rubber adhesion. Two tires will be cut up and studied. The remaining casings were retreaded for further testing. All of the tires except the one that failed appeared to be in good condition. Of the tires that were retreaded, none showed signs of brass-cord corrosion.

We claim:

1. In a pneumatic vehicle tire containing rubber, filler, curing agent, brass-to-rubber bonding agent other than cobalt, cure accelerator, carbon black and zinc oxide, the tire being reinforced at least in part with brass-plated steel cord, wherein the improvement comprises the presence of from 0.1 to 3.0 phr of an aromatic triazole in the rubber surrounding the steel cord.

2. The tire of claim 1 further characterized by the triazole being selected from the group consisting of benzotriazole and tolyltriazole.

3. The tire of claim 1 further characterized by the presence of from 0.1 to 5 phr of a rubber-to-brass adhesion promotor containing cobalt in the rubber surrounding the steel cord.

4. The tire of claim 3 further characterized by the adhesion promotor having a formula, $(R-CO_2-Co-O)_3B$ wherein, R is a branched hydrocarbon chain having an average of 18 to 22 carbon atoms.

5. The tire of claim 3 wherein from 0.1 to 5.0 phr of an antioxidant is present in the rubber surrounding the steel cord.

* * * * *